United States Patent [19]

Nishida et al.

[11] Patent Number: 4,677,872
[45] Date of Patent: Jul. 7, 1987

[54] METHOD OF FITTING GRIP OVER HANDLEBAR AND GRIP USED IN CARRYING THE METHOD INTO PRACTICE

[75] Inventors: Hiroshi Nishida, Miki; Takemi Inoue, Kakogawa, both of Japan

[73] Assignee: Kawasaki Jukogyo Kabushiki Kaisha, Hyogo, Japan

[21] Appl. No.: 760,763

[22] Filed: Jul. 31, 1985

[30] Foreign Application Priority Data

Jul. 31, 1984 [JP] Japan ............................ 59-117686[U]

[51] Int. Cl.$^4$ ............................................. B62K 21/26
[52] U.S. Cl. .............................. 74/551.9; 16/DIG. 12; 29/235; 29/DIG. 1
[58] Field of Search ............................ 74/551.9, 558.5; 16/110 R, DIG. 12, DIG. 19; 29/235, DIG. 1

[56] References Cited

U.S. PATENT DOCUMENTS

| 652,981 | 7/1900 | Pratt | 74/551.9 |
|---|---|---|---|
| 1,608,206 | 11/1926 | Freedlander | 29/235 |
| 1,980,655 | 11/1934 | Balistreri | 16/DIG. 12 |
| 1,983,756 | 12/1934 | Hessmert | 74/551.9 |
| 3,022,573 | 2/1962 | Bullock | 29/235 |
| 3,846,901 | 11/1974 | Lovett | 29/235 |
| 3,900,941 | 8/1975 | Browning et al. | 29/235 |
| 3,992,570 | 11/1976 | Beinhaur | 74/551.9 |
| 4,016,640 | 4/1977 | Briggs | 29/235 |
| 4,031,775 | 6/1977 | Petty | 74/551.9 |
| 4,054,743 | 10/1977 | Mayer et al. | 29/235 |

FOREIGN PATENT DOCUMENTS 0546457 2/1977 U.S.S.R. ............................... 29/235

*Primary Examiner*—Alan Cohan
*Assistant Examiner*—John A. Rivell

[57] ABSTRACT

A method of fitting a grip over a handle portion of a handlebar includes providing the grip with an integral lip directed radially inwardly along the entire front edge at the open end of the grip. The grip is fitted over the forward end portion of the handle portion to define a sealed chamber between the inner surface of the grip and the outer surface of the handle portion. Air is injected into the chamber to expand the grip which is then moved over the handle portion. Thereafter the air is withdrawn so that the grip contracts into intimate contact with the handle grip to be adhesively secured thereto.

3 Claims, 4 Drawing Figures

METHOD OF FITTING GRIP OVER HANDLEBAR AND GRIP USED IN CARRYING THE METHOD INTO PRACTICE

FIELD OF THE INVENTION AND RELATED ART STATEMENT

This invention relates to a method of fitting a grip over a handle portion of a handlebar of a motorcycle, small marine craft, etc., and a grip suitable for use in carrying the method into practice.

FIG. 1 shows a handlebar device usually used with a motorcycle, small marine craft, snow mobile, etc. In FIG. 1, the numeral 1 designates a handlebar, and the numeral 2 a bracket which is secured to a front fork, not shown, for supporting a front wheel. The numeral 3 designates grips each fitted over one of two handle portions at opposite end portions of the handlebar 1. The numeral 4 designates switch boxes each having a switch mounted therein for turning on and off a front light or a turn indicator.

The grip 3 shown in FIG. 1 will be described in detail by referring to FIG. 2 in which the handlebar 1 and grips 3 have an outer diameter d and an inner diameter D, respectively, which have the following relation: $d > D$. With this arrangement, each grip 3 can be held in intimate contact with the respective handle portion of the handlebar 1 when the former is fitted over the latter. The numeral 5 designates an air escape for withdrawing air from a closed chamber to be formed between the end surface of the handle portion of the handlebar and the inner surface of the grip in case of fitting the grip over the handle portion.

In fitting the grip 3 over the respective handle portion of the handlebar 1, it is usual practice to apply an adhesive agent either to an outer surface of the handle portion of the handlebar 1 or to an inner surface of the grip 1.

Since the outer diameter d of the handle portion of the handlebar 1 and the inner diameter D of the grip 3 has the relation $d > D$ as aforesaid, difficulties have been experienced in providing necessary bond strength between the outer surface of the handlebar 1 and the grip 3. More specifically, when the adhesive agent is applied to the handle portion of the handlebar 1, a forward end portion 3a of the grip 3 has tended to scrape the adhesive agent of the surface of the handlebar 1 as the grip 3 is fitted over the handle portion, making it impossible to secure a rear end portion 3b of the grip 3 to the handlebar 1 with sufficiently high bond strength to avoid dislodging of the grip 3. Conversely, when the adhesive agent is applied to the inner surface of the grip 3, the adhesive agent applied to the inner surface of the forward end portion 3a of the grip 3 has tended to be forced to move toward the rear end portion 3b thereof, making it impossible to secure the forward end portion 3a of the grip 3 to the handlebar 1 with sufficiently high bond strength to avoid dislodging of the grip 3.

OBJECT AND SUMMARY OF THE INVENTION

This invention has as its object the provision of a method of fitting a grip over each handle portion of a handlebar of a motorcycle, snow mobile, etc., and a grip suitable for use in carrying the method into practice which make it possible to fit the grip in a taut condition over the handle portion while an adhesive agent is uniformly applied, to enable the former to adhere to the latter with a high degree of bond strength.

The aforesaid object can be accomplished according to the invention by partly inserting the handle portion of a handlebar into the grip to form a sealed chamber between an inner surface of the grip and an outer surface of the handle portion of the handlebar, injecting air into the sealed chamber by an air injector to expand the grip, moving the grip over the handle portion of the handlebar until a predetermined position is reached, and releasing the air from the sealed chamber to the atmosphere to allow the inner surface of the grip and the outer surface of the handle portion of the handlebar to adhesively adhere to each other.

In the method described hereinabove according to the invention, an adhesive agent may be applied to the inner surface of the grip.

In the method described hereinabove according to the invention, an adhesive agent may be injected in atomized particles into the sealed chamber together with the air by the air injector.

The aforesaid object can be further accomplished according to the invention by providing a grip, suitable for use in carrying the method according to the invention into practice, which is formed at its front edge with a lip which, extending along the entire front edge of an open forward end, is directed radially inwardly.

DETAILED DESCRIPTION OF THE PREFERRED EMBODIMENTS

Figure 1:
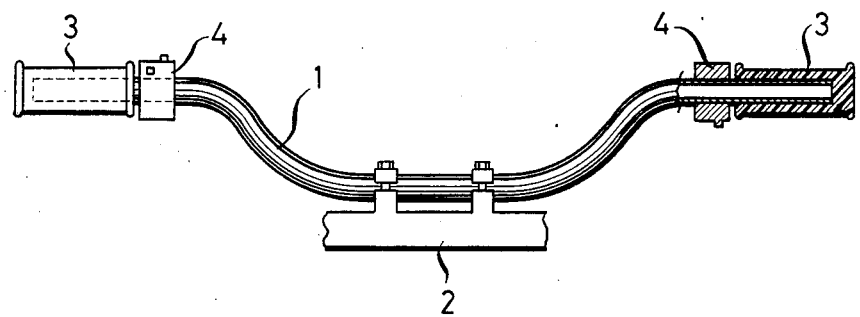
FIG. 1 is a front view, with certain parts being shown in section, of a handlebar device of the prior art used with a motorcycle.
Figure 2:
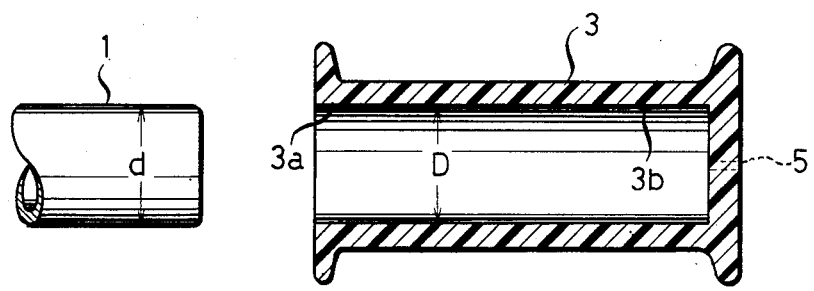
FIG. 2 is a sectional view of a grip and a handlebar of the prior art in relation to each other.
Figure 3:
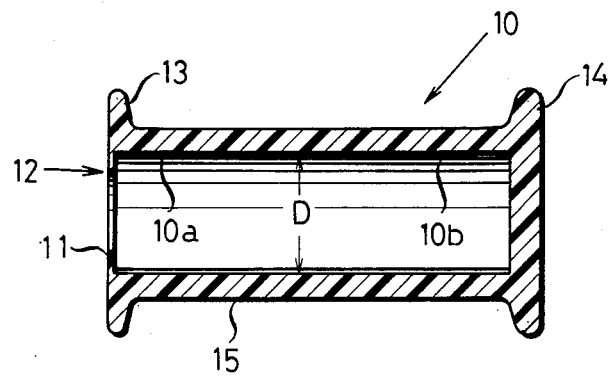
FIG. 3 is a sectional view of the grip of the handlebar comprising one embodiment of the invention.

Referring to FIG. 3, a grip generally designated by the reference numeral 10 is substantially cylindrical in configuration and comprises a forward end portion 10a and a rearward end portion 10b. The grip 10 which is open at a front end and closed at a rear end has formed integrally therewith a lip 11 which, being directed radially inwardly, is located along an entire front edge 12 of the forward end portion 10a. A flange 13 is formed at the forward end portion 10a, and another flange 14 is formed at the rearward end portion 10b, to define a grasp 15 between the front and rear ends of the grip 10 to enable the hand to firmly grasp the handle portion of the handlebar 1 without being dislodged therefrom.

Figure 4:
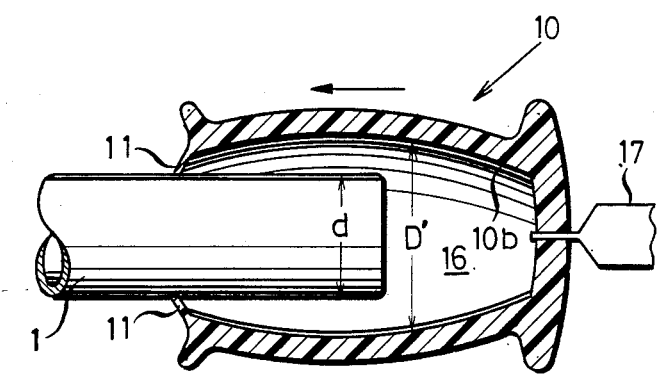
FIG. 4 is a sectional view of the grip shown in FIG. 3 in the process of being fitted over a handle portion of a handlebar.

The method of fitting the grip 10 over the handle portion of the handlebar 1 according to the invention will now be described by referring to FIG. 4. The grip 10 having an adhesive agent applied to its inner surface is fitted over the handle portion of the handlebar 1. When the grip is made to engage the handle portion of the handlebar 1 at its forward end portion and forced to move forwardly, the lip 11 integral with the grip 10 is expanded against its own resilience and brought into contact with the outer surface of the handle portion of the handlebar 1.

The resilience of the lip 11 enables a sealed chamber 16 to be formed between the outer surface of the handle portion of the handlebar 1 and the inner surface of the grip 10 and kept airtight since the end of the handle portion is also sealed airtight. Then, an air injector 17 is pushed at its tip through a rear end of the grip 10 into the sealed chamber at the rear end portion 10b, to inject air into the sealed chamber. As a result, the grip 10 swells in balloon form as shown in FIG. 4, to increase the inner diameter D of the grip 10 to D' which is much greater than the outer diameter d of the handlebar 1. At this time, the lip 11 is oriented forwardly by introducing air into the sealed chamber by the air injection through the rear end of the grip 10 and the diameter of an aperture defined by the lip 11 becomes slightly larger than the outer diameter d of the handlebar 1, to allow air to escape from the sealed chamber in a small amount. With some air thus leaking through the forward end portion 10a, the grip 10 is moved forwardly as indicated by an arrow while air is constantly injected into the sealed chamber by the air injector 17, until the rearward end portion 10b of the grip 10 is fitted over the handle portion of the handlebar 1 and the rear end of the grip 10 is brought into abutting engagement with a front end of the handlebar 1.

Thereafter, the air injector 17 is made to reverse its action and withdraw air from the sealed chamber. This allows the grip 10 to contract by its own resilience into intimate contact with the handle portion of the handlebar 1, so that the grip 10 can be adhesively secured to the handle portion of the handlebar 1 with high bond strength.

In the embodiment shown and described hereinabove, the grip 10 has been described as having an adhesive agent applied beforehand to its inner surface before the grip 10 is fitted over the handle portion of the handlebar 1. However, the invention is not limited to this specific form of embodiment and an adhesive agent may be injected in atomized particles into the sealed chamber together with the air injected by the air injector 17, so that the adhesive agent can be applied both to the inner surface of the grip 10 and to the outer surface of the handle portion of the handlebar 1.

From the foregoing description, it will be appreciated that the invention enables the grip to be firmly secured to the handle portion of the handlebar with an adhesive agent uniformly applied either only to the inner surface of the grip or both to the inner surface of the grip and to the outer surface of the handle portion of the handlebar. In the method of fitting a grip over the handle portion of a handlebar according to the invention, the need to make the inner diameter of the grip smaller than the outer diameter of the handle portion of the handlebar is eliminated. This is conducive to simplification of operation and improved efficiency.

What is claimed is:

1. A method of fitting a grip over a handle portion of a handlebar, comprising the steps of:
    providing the grip with a lip formed integrally with the main body of the grip, said lip being directed radially inwardly and located along an entire front edge at an open end of the grip;
    forming the grip and integral lip of elastic material;
    bringing the grip into contact with a forward end portion of the handle portion of the handlebar in such a manner that a sealed chamber is defined between an inner surface of the grip and outer surface of the handle portion;
    injecting air into the sealed chamber by an air injector, to expand the grip;
    moving the grip over the handle portion of the handlebar until a predetermined position is reached; and
    withdrawing the air from the sealed chamber to allow the grip to be brought into intimate contact at its inner surface with the handle portion at its outer surface, to enable the grip to be adhesively secured to the handle portion of the handlebar.

2. A method of fitting a grip over a handle portion of a handlebar as claimed in claim 1, wherein the adhesive agent is applied beforehand to the inner surface of the grip.

3. A method of fitting a grip over a handle portion of a handlebar, comprising the steps of:
    providing the grip with a lip formed integrally with the main body of the grip, said lip being directed radially inwardly and located along an entire front edge at an open end of the grip;
    bringing the grip into contact with a forward end portion of the handle portion of the handlebar in such a manner that a sealed chamber is defined between an inner surface of the grip and outer surface of the handle portion;
    injecting air together with an adhesive agent in atomized particles into the sealed chamber by an air injector to expand the grip;
    moving the grip over the handle portion of the handlebar until a predetermined position is reached; and
    withdrawing the air from the sealed chamber to allow the grip to be brought into intimate contact at its inner surface with the handle portion at its outer surface, to enable the grip to be adhesively secured to the handle portion of the handlebar.

* * * * *